United States Patent [19]
Asao et al.

[11] Patent Number: 6,037,694
[45] Date of Patent: Mar. 14, 2000

[54] ROTOR FOR AN AUTOMOTIVE ALTERNATOR

[75] Inventors: Yoshihito Asao; Katsumi Adachi; Kyoko Higashino, all of Tokyo, Japan

[73] Assignee: Mitsubishi Denki Kabushiki Kaisha, Tokyo, Japan

[21] Appl. No.: 09/282,426

[22] Filed: Mar. 31, 1999

[30] Foreign Application Priority Data

Sep. 4, 1998 [JP] Japan .................................. 10-251489

[51] Int. Cl.⁷ .................................................. H02K 1/22
[52] U.S. Cl. ........................ 310/261; 310/208; 310/164; 310/179; 310/194; 310/263
[58] Field of Search .................... 310/208, 201, 310/164, 179, 180, 194, 263; 242/159, 118.4, 118.7; 29/605; 174/133 R

[56] References Cited

U.S. PATENT DOCUMENTS

| | | | |
|---|---|---|---|
| 4,925,125 | 5/1990 | LeCompte | 242/159 |
| 4,988,055 | 1/1991 | Sakai et al. | 242/159 |
| 5,154,366 | 10/1992 | LeCompte | 242/159 |
| 5,174,013 | 12/1992 | Hiroshima et al. | 29/605 |
| 5,209,416 | 5/1993 | LeCompte | 242/159 |
| 5,574,324 | 11/1996 | Hirama et al. | 310/194 |
| 5,714,822 | 2/1998 | Kawano et al. | 310/179 |
| 5,796,201 | 8/1998 | Kamitani et al. | 310/194 |
| 5,898,252 | 4/1999 | Tanaka | 310/208 |
| 5,900,688 | 5/1999 | Kreuzer | 310/194 |

FOREIGN PATENT DOCUMENTS

2-243468  9/1990  Japan .

*Primary Examiner*—Elvin Enad
*Assistant Examiner*—Saeed Ghahramani
*Attorney, Agent, or Firm*—Sughrue, Mion, Zinn, Macpeak & Seas, PLLC

[57] ABSTRACT

A rotor for an automotive alternator comprises a cylindrical bobbin fitted over the base portions of a pair of field cores having a cylindrical portion, a pair of first and second annular flange portions projecting perpendicularly from both ends of the cylindrical portion, a recessed groove disposed at an angle to the radial direction in the inner wall of the first flange portion, and an anchor portion disposed on an outer circumferential portion of the first flange portion in close proximity to the outer circumferential end of the recessed groove; and a field winding having a circular cross-section, the starting portion of which is wound around the anchor portion and housed in the recessed groove, then drawn from the inner circumferential end of the recessed groove onto the outer circumferential surface of the cylindrical portion of the bobbin, and additionally wound a predetermined number of turns into multiple layers on the cylindrical portion of the bobbin, at least one portion of the field winding excluding the prewind portion and the postwind portion being formed with a rectangular cross-section.

6 Claims, 6 Drawing Sheets

ROTOR FOR AN AUTOMOTIVE ALTERNATOR

BACKGROUND OF THE INVENTION

1. Field of the Invention

The present invention relates to a rotor for an automotive alternator, which has a Lundell-type field core, for mounting on an automobile engine, and in particular, relates to a winding configuration for winding onto the Lundell-type field core.

2. Description of the Related Art

Figure 6:
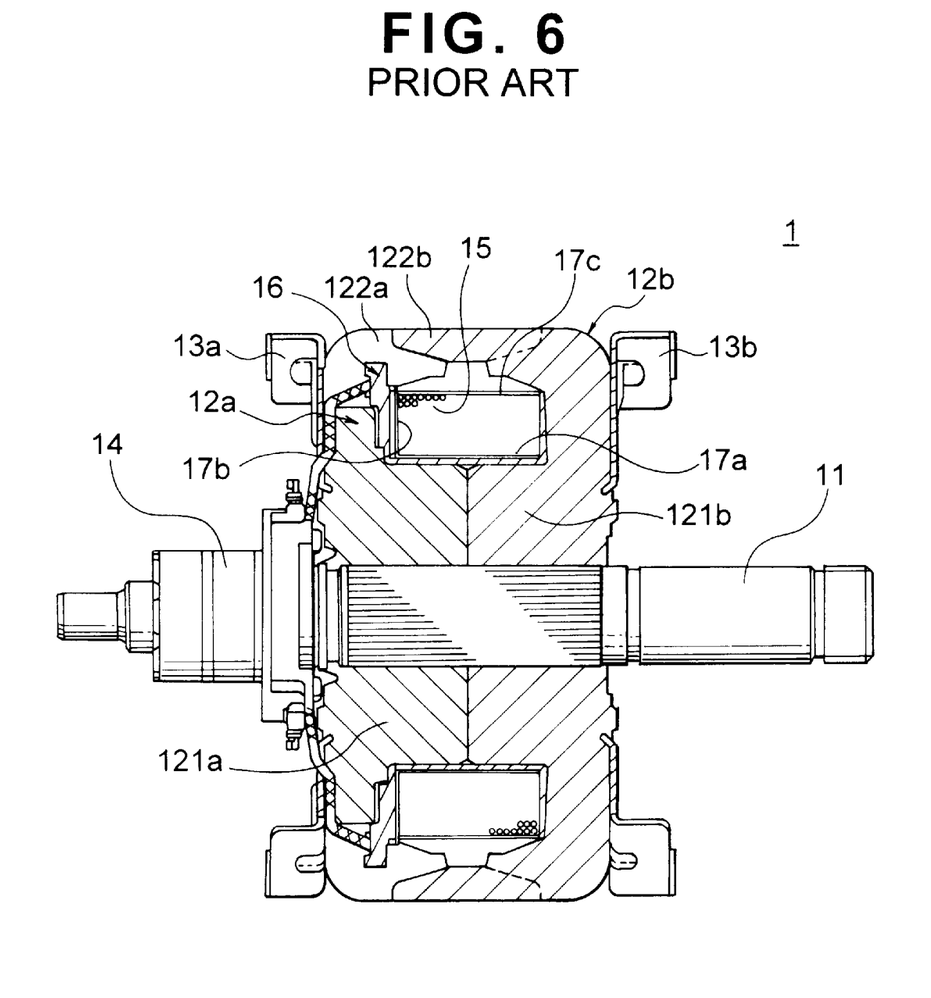
FIG. 6 is a cross-section of a conventional rotor for an automotive alternator.
Figure 7:
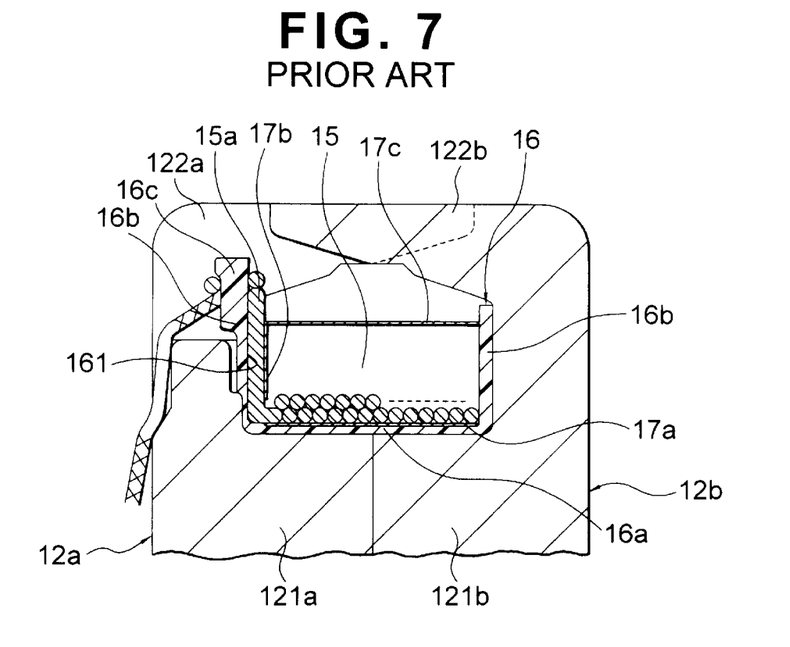
FIG. 7 is a partial cross-section of the conventional rotor for an automotive alternator.
Figure 8:
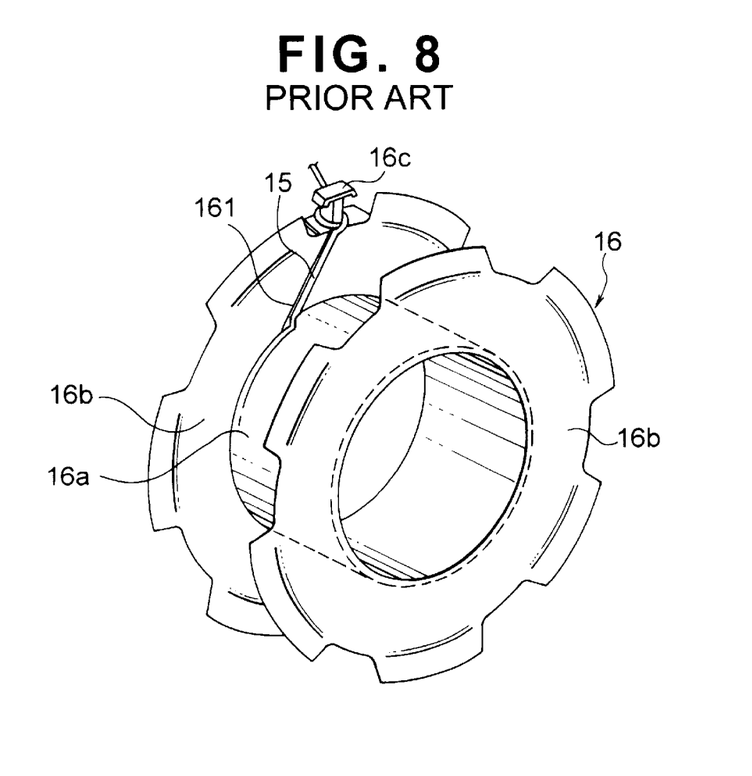
FIG. 8 is a perspective view of a bobbin used in the conventional rotor for an automotive alternator.

FIG. 6 is a cross-section of a conventional rotor for an automotive alternator, FIG. 7 is a cross-section of part of the rotor shown in FIG. 6, and FIG. 8 is a perspective view of a bobbin used in the rotor shown in FIG. 6.

In FIGS. 6 to 8, a rotor 1 comprises a rotating shaft 11 rotatably supported by a bracket (not shown), a pair of Lundell-type field cores 12a, 12b secured to the rotating shaft 11, a pair of fans 13a, 13b secured to both axial ends of the field cores 12a, 12b, slip rings 14 secured to one end of the rotating shaft 11, and a field winding 15 wound onto the field cores 12a, 12b.

The field cores 12a, 12b are made of iron, comprise cylindrical base portions 121a, 121b fitted over and secured to the rotating shaft 11 and claw-shaped magnetic poles 122a, 122b plurally projecting from the outer circumferential edges of the base portions 121a, 121b, and are secured to the rotating shaft 11 facing each other such that the end surfaces of the base portions 121a, 121b are in close contact with each other and the claw-shaped magnetic poles 122a, 122b intermesh alternately. The field winding 15 is a copper wire with a circular cross-section and is wound a predetermined number of times onto a bobbin 16 fitted over the outer circumferences of the base portions 121a, 121b. A magnetic flux is generated when an electric current is supplied to the field winding 15 by means of the slip rings 14 and magnetic poles are formed in the field cores 12a, 12b by the magnetic flux.

The bobbin 16 is made of resin, and as shown in FIG. 8, comprises a cylindrical portion 16a and a pair of first and second annular flange portions 16b projecting perpendicularly from both ends of the cylindrical portion 16a. A recessed groove 161 with a U-shaped cross-section for housing a lead wire 15a at the start of the winding is disposed radially in the inner wall of the first flange portion 16b so as to extend from the outer circumferential side thereof to the cylindrical portion 16a. An anchor portion 16c is disposed on an outer circumferential portion of the first flange portion 16b in close proximity to the outer circumferential end of the recessed groove 161.

Inner circumferential tape 17a for protecting the winding is wound onto the cylindrical portion 16a of the bobbin 16. Outer circumferential tape 17c for protecting the winding is also wound onto the outer circumference of the field winding 15 wound onto the bobbin 16. In addition, side tape 17b is disposed between the lead portion of the field winding 15 and the multi-layered portion of the field winding 15.

The construction of the field winding 15 will now be explained.

First, the inner circumferential tape 17a is wound onto the cylindrical portion 16a of the bobbin 16. Then, the starting portion of the field winding 15 is wound around the anchor portion 16c, inserted into the recessed groove 161, and drawn from the lower end (inner circumferential end) of the recessed groove 161 along the inner wall of the first flange portion 16b onto the cylindrical portion 16a. At this point, the side tape 17b is pasted onto the inner wall of the first flange portion 16b so as to cover the lead wire 15a at the start of the field winding 15 which is housed in the recessed groove 161. Then, the field winding 15 drawn out onto the cylindrical portion 16a is lined up in rows in the axial direction as it is wound onto the cylindrical portion 16a from the first flange portion 16b to the second flange portion 16b. Then, when the first layer of the winding is finished, the field winding 15 is lined up in rows in the axial direction as it is wound onto the cylindrical portion 16a from the second flange portion 16b to the first flange portion 16b. In this way, the field winding 15 is wound up layer by layer in order from the bottom of the cylindrical portion 16a, and when a predetermined number of layers have been wound, the outer circumferential tape 17c is wound onto the outermost circumferential portion. In addition, the multi-layered portion of the field winding 15 is saturated with varnish.

In the rotor 1 constructed in this manner, centrifugal force acts constantly on the field winding 15 during power generation, and even slight gaps and looseness are gradually enlarged, leading to disarray in the winding. Thus, in order to achieve winding without gaps or looseness, it is usual to apply tension to the wire as it is wound onto the bobbin 16, and the starting configuration, in which the field winding 15 is wound onto the anchor portion 16c of the bobbin 16 and further housed in the recessed groove 161 disposed in the inner wall of the flange portion 16b of the bobbin 16, has also been adopted for this purpose.

In a conventional rotor for an automotive alternator constructed in this manner, the field winding 15, which has a circular cross-section, is lined up in rows in the axial direction as it is wound onto the cylindrical portion 16a. Thus, when the second layer is wound and lined up on top of the circumferentially innermost first layer after the first layer has been completely wound and lined up in rows in the axial direction, the center of the wire in the second layer is displaced by one radius in the axial direction, as shown in FIG. 7.

In a conventional winding configuration of this kind, portions of the winding are in contact with other portions at points, and since many layers are wound, the winding pressure and the weight of winding in the outer circumference act on the winding in the inner circumference, and there is a risk that the wire will be deformed or displaced in the axial direction.

Figure 9:
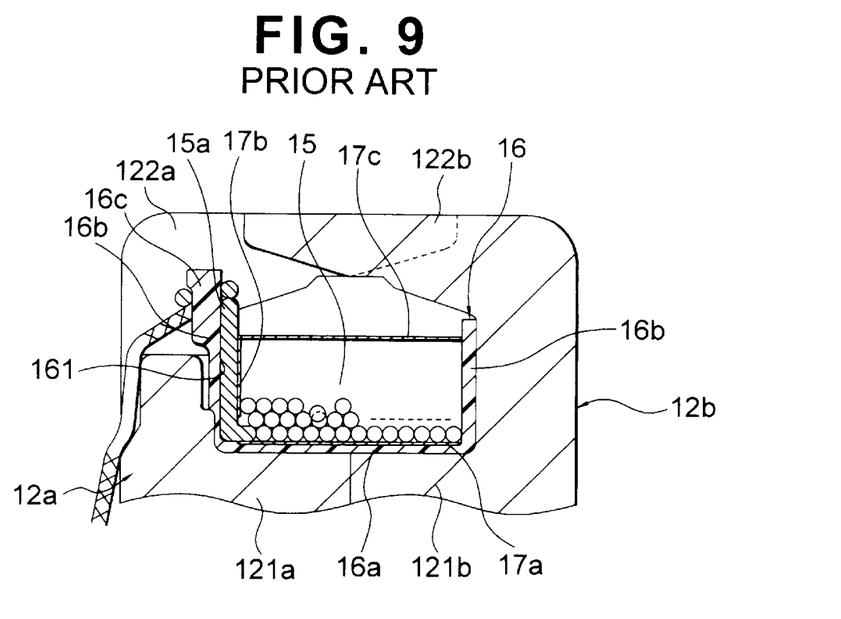
FIG. 9 is a cross-section explaining the riding of portions of the multi-layered portion of a field winding in a conventional rotor for an automotive alternator.

Also, if the center of the wire is displaced by more than one radius or less than one radius in the axial direction, portions of the winding ride on adjacent portions and large irregularities arise, which soon leads to disarray as shown in FIG. 9. Such irregularities accumulate and increase towards the outer circumference, making alignment of the winding in the outer circumference difficult.

Thus, one problem is that the configuration of the multi-layered portion constructed by winding the field winding 15 onto the cylindrical portion 16a in many layers is effectively eccentric, and the eccentric portions and non-circular portions are gradually enlarged by the centrifugal force acting during high-speed rotation, giving rise to frequent disarray and increasing vibrations in the multi-layered portion, which leads to bending of the rotating shaft 11 or disconnection of the winding connections.

Also, in the conventional rotor, the field winding 15 is housed in the recessed groove 161 disposed in the inner wall of the flange portion 16b of the bobbin 16 so that tension can be applied to the winding as it is wound onto the bobbin 16.

Figure 10:
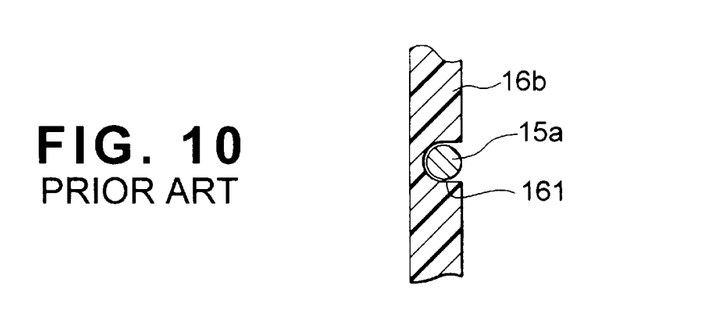
FIG. 10 is a cross-section explaining a housing for a lead wire of a field winding in a conventional rotor for an automotive alternator.

However, the shape of the recessed groove 161 is determined by the circular cross-section of the field winding 15 and, as shown in FIG. 10, an axially thin-walled portion is formed in the bobbin 16, most of which is already formed to a thickness of 1 mm or less. As a result, another problem is that cracks form in the thin-walled portion, giving rise to malfunction due to interference between the winding and the core.

Figure 11:
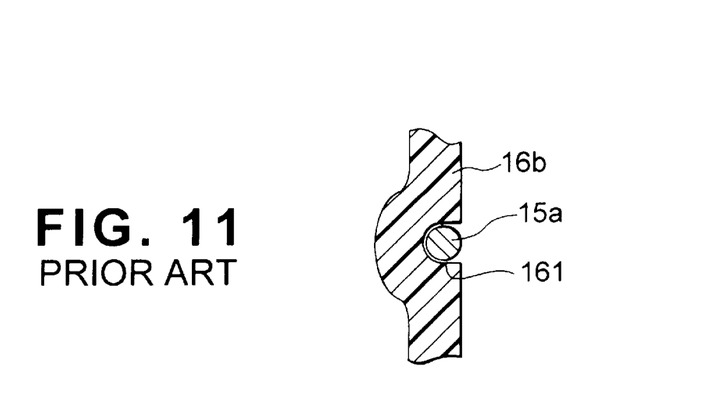
FIG. 11 is a cross-section explaining another housing of a lead wire of a field winding in a conventional rotor for an automotive alternator.

In order to avoid this, projection of the outer circumferential portion of the recessed groove 161 outwards has been considered, as shown in FIG. 11, to ensure that the outer circumferential portion of the recessed groove 161 is strong. However, in that case, it is necessary to provide a recessed portion in the portion of the field core 12*a* corresponding to the projecting portion on the outer circumferential portion of the recessed groove 161, which influences the quality and performance of the field core 12*a* as a rotating body requiring balance.

SUMMARY OF THE INVENTION

The present invention aims to solve the above problems and an object of the present invention is to provide a rotor for an automotive alternator which has superior resistance to centrifugal force, as well as facilitating connection of the prewind and postwind portions of the field winding to connection terminals by forming a portion of the field winding, which has a circular cross-section, into a rectangular cross-section, and winding the region of the field winding formed with a rectangular cross-section onto the cylindrical portion of the bobbin to achieve reliable alignment and eliminate eccentricity in the multi-layered portion of the field winding, or by housing the region of the field winding formed with a rectangular cross-section in a recessed groove with a rectangular cross-section disposed in a flange portion of the bobbin to ensure that the portion around the outside of the recessed groove is strong without enlarging the axial dimension of the bobbin.

In order to achieve the above object, according to one aspect of the present invention, there is provided a rotor for an automotive alternator comprising a pair of field cores each having a cylindrical base portion and a plurality of claw-shaped magnetic poles projecting from the outer circumferential edges of the base portions, the field cores being secured to a rotating shaft facing each other such that the end surfaces of the base portions are in close contact with each other and the claw-shaped magnetic poles intermesh with each other; a cylindrical bobbin fitted over the base portions of the pair of field cores, the bobbin having a cylindrical portion, a pair of first and second annular flange portions projecting perpendicularly from both ends of the cylindrical portion, a recessed groove disposed at an angle to the radial direction in the inner wall of the first flange portion, and an anchor portion disposed on an outer circumferential portion of the first flange portion in close proximity to the outer circumferential end of the recessed groove; and a field winding having a circular cross-section, the starting portion of which is wound around the anchor portion and housed in the recessed groove, then drawn from the inner circumferential end of the recessed groove onto the outer circumferential surface of the cylindrical portion of the bobbin, and additionally wound a predetermined number of turns into multiple layers on the cylindrical portion of the bobbin, wherein at least one portion of the field winding excluding the prewind portion and the postwind portion is formed with a rectangular cross-section.

DETAILED DESCRIPTION OF THE PREFERRED EMBODIMENTS

The preferred embodiments of the present invention will now be explained with reference to the drawings.
Embodiment 1

Figure 1:
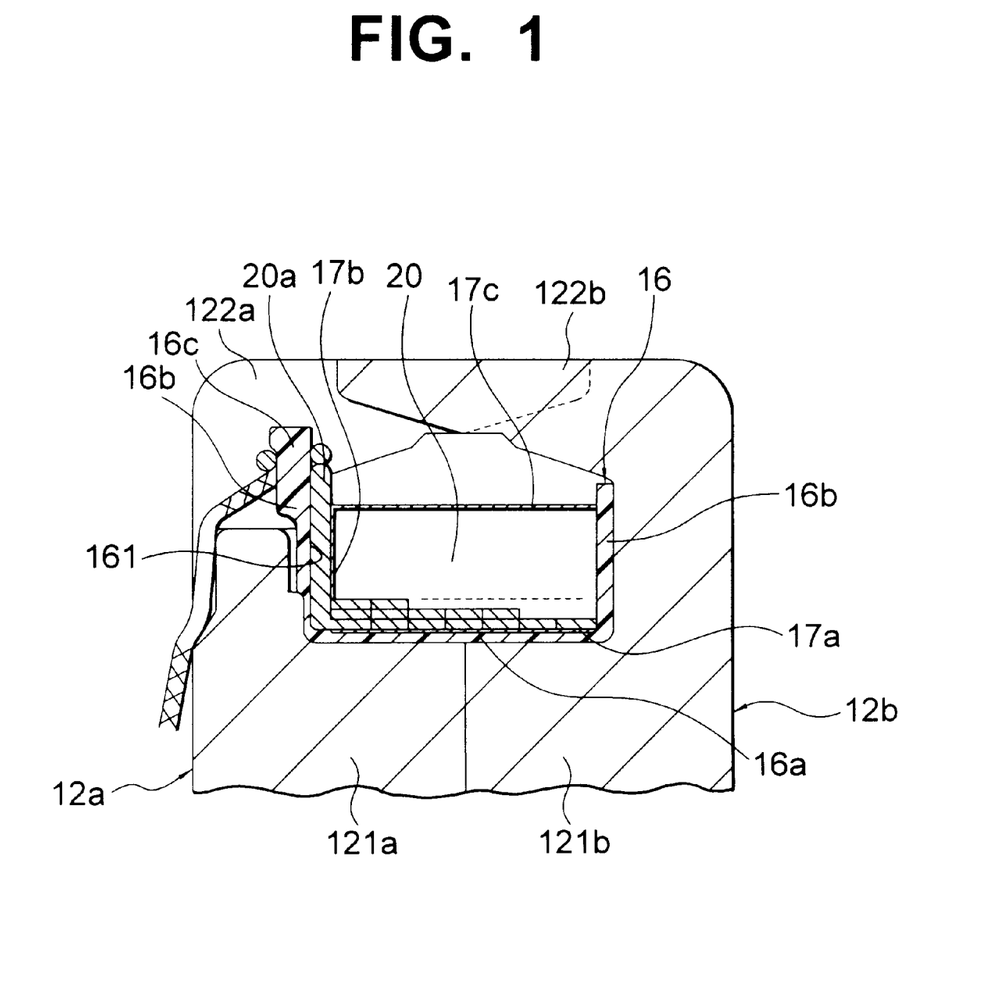
FIG. 1 is a partial cross-section of a rotor for an automotive alternator according to Embodiment 1 of the present invention.

FIG. 1 is a partial cross-section of a rotor for an automotive alternator according to Embodiment 1 of the present invention.

In FIG. 1, a portion of a field winding 20, which is made of circular copper wire, is deformed to have a rectangular cross-section, and the portion of the field winding 20 having the rectangular cross-section is wound onto a cylindrical portion 16*a* of a bobbin 16.

First, an inner circumferential tape 17*a* is wound onto the cylindrical portion 16*a* of a bobbin 16. Then, the starting portion of this field winding 20 is wound around an anchor portion 16*c* on the bobbin 16, then inserted into a recessed groove 161 having a U-shaped cross-section, and thereafter drawn from the inner circumferential end of the recessed groove 161 along the inner side tape 17*b* is pasted onto the inner wall of the first flange portion 16*b* so as to cover the lead wire 20*a* at the start of the field winding 20 which is housed in the recessed groove 161. Then, the field winding 20 drawn out onto the cylindrical portion 16*a* is lined up in rows in the axial direction as it is wound onto the cylindrical portion 16*a* from the first flange portion 16*b* to a second flange portion 16*b*. At this time, the field winding 20 is wound onto the cylindrical portion 16*a* such that the pair of broad flat surfaces face the inner circumferential side and the outer circumferential side, respectively, relative to the radial direction of the cylindrical portion 16*a*. Then, when a first layer of winding is finished, a second layer is lined up in rows in the axial direction as it is wound on top of the first layer of winding from the second flange portion 16*b* back to the first flange portion 16*b*. In this way, the field winding 20 is wound up layer by layer in order from the bottom of the cylindrical portion 16*a*, and when a predetermined number of layers have been wound, the outer circumferential tape 17c is wound onto the outermost circumferential portion. In addition, the multi-layered portion of the field winding 20 is saturated with varnish.

Moreover, the rest of the construction is the same as for the conventional rotor shown in FIGS. 6 to 8.

In a rotor constructed in this manner, the portion of the field winding 20 constituting the multi-layered portion has a rectangular cross-section, and therefore adjacent portions of the field winding 20 are lined up in rows in both the axial and radial directions with flat surfaces in contact.

Thus, even if the field winding 20 is wound in multiple layers, the field winding 20 on the inner circumferential side is unlikely to be deformed. Furthermore, dispersion of diameter of the multi-layered portion in an axial direction is reduced and therefore the multi-layered portion of the field winding 20 can be formed with a uniform diameter without eccentricities. As a result, rotor vibrations caused by the centrifugal force acting during high-speed rotation can be suppressed, preventing bending of the rotating shaft 11 and disconnection of the winding connections resulting therefrom. In addition, disarray in the winding caused by the centrifugal force acting during high-speed rotation can also be prevented. In other words, strength is increased with respect to high-speed rotation.

Also, spacing between portions of the field winding 20 in the axial direction and the radial direction is practically reduced to zero, achieving a strongly aligned construction, in other words, the rigidity of the multi-layered portion is increased, improving the resistance thereof to vibrations and suppressing the generation of disarray in the winding.

In addition, the edges of the portions of the field winding 20 previously wound can serve as guides for further winding, facilitating alignment and improving the winding operation of the field winding 20.

At this point, the prewind portion and the postwind portion of the field winding are wound onto and soldered to terminals on slip rings 14. That is to say, in the operation of connection to the slip rings 14, the prewind portion and the postwind portion of the field winding extending from the bobbin 16 are shaped by bending or twisting and brought close to the terminals of the slip rings 14, and additionally wound onto the terminals.

Thus, if the entire field winding were formed with rectangular cross-section, the operation of shaping the wire to approach the terminals of the slip rings 14 from the bobbin 16 and the operation of winding the wire onto the terminals would be difficult, but in Embodiment 1, the prewind portion and the postwind portion of the field winding 20 are formed from copper wire with a circular cross-section, whereby the operation of shaping the wire to approach the terminals of the slip rings 14 from the bobbin 16 and the operation of winding the wire onto the terminals are facilitated, improving workability.

Embodiment 2

In Embodiment 2, the portion of the field winding 20 constituting the multi-layered portion is formed with a rectangular cross-section having a width which is a simple fraction of the distance between a pair of flange portions 16b of a bobbin 16.

Moreover, the rest of the construction is the same as for Embodiment 1.

In Embodiment 2, the width of the rectangular cross-section of the field winding 20 is a simple fraction of the distance between the flange portions 16b, enabling the field winding to be wound between the flange portions 16b without gaps. Thus, each layer of the multi-layered portion can be wound reliably in rows without movement in the axial direction, preventing disarray of the winding as well as reducing deformation and rotation of the bobbin.

Embodiment 3

Figure 2:
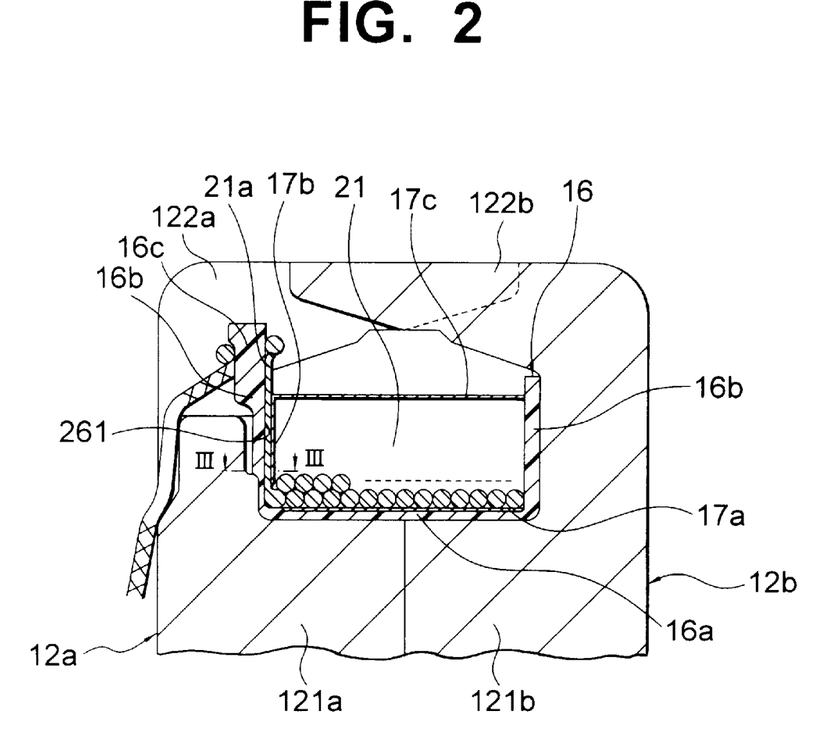
FIG. 2 is a partial cross-section of a rotor for an automotive alternator according to Embodiment 3 of the present invention.
Figure 3:
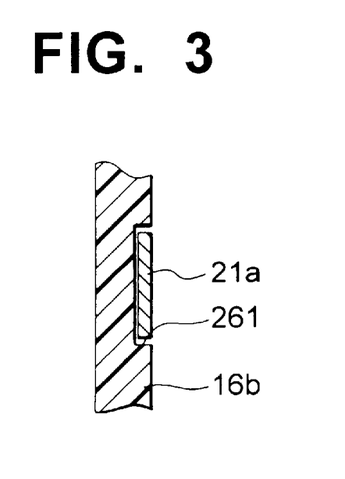
FIG. 3 is a view in the direction of the arrows of a cross-section taken along line III—III in FIG. 2.

FIG. 2 is a partial cross-section of a rotor for an automotive alternator according to Embodiment 3 of the present invention and FIG. 3 is a view in the direction of the arrows of a cross-section taken along line III—III in FIG. 2

In Embodiment 3, a portion of a field winding 21, which is made of a circular copper wire, is deformed to have a rectangular cross-section, the portion formed with a rectangular cross-section being the portion corresponding to a lead wire 21a at the start of the winding. A recessed groove 261 formed in the inner wall of a first flange portion 16b is formed with a rectangular cross-section approximately matching the outer shape of the rectangular cross-section of the lead wire 21a, and the lead wire 21a is housed therein.

Moreover, the rest of the construction is the same as for the conventional rotor shown in FIGS. 6 to 8.

In Embodiment 3, as shown in FIG. 3, the recessed groove 261 disposed in the first flange portion 16b is formed to approximately match the outer shape of the lead wire 21a having a rectangular cross-section, ensuring that the outer circumferential portion of the recessed groove 261 is not made thinner than necessary and thereby suppressing reductions in the strength thereof.

Consequently, the generation of cracks in the recessed groove 261 portion of the bobbin 16 caused by the centrifugal force acting during high-speed rotation is prevented.

Also, since the axial dimension of the bobbin 16 is not enlarged, it is not necessary to provide a recessed portion in the field core 12a as in the conventional art, and therefore the quality and performance of the field core 12a as a rotating body requiring balance are not affected.

Moreover, the area of contact between the lead wire 21a and the recessed groove 261 is broadened, facilitating alignment of the lead wire 21a in the recessed groove 261 and thereby improving reliability.

Furthermore, by making the rectangular cross-section of the lead wire the same shape, the same bobbin 16 can be used in rotors employing field winding wires with different diameters, enabling costs to be reduced.

Embodiment 4

Figure 4:
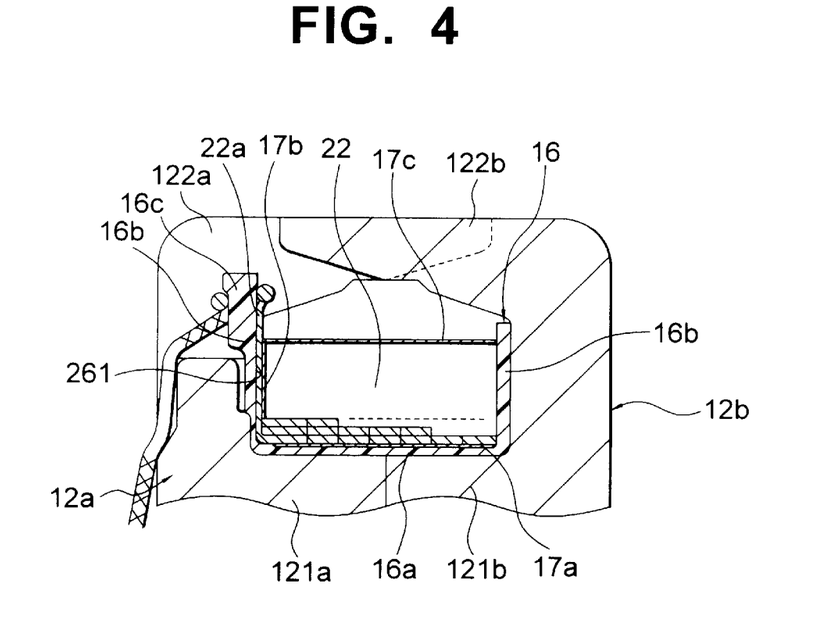
FIG. 4 is a partial cross-section of a rotor for an automotive alternator according to Embodiment 4 of the present invention.

FIG. 4 is a partial cross-section of a rotor for an automotive alternator according to Embodiment 4 of the present invention.

In the figure, a portion of a field winding 22, which is made of a circular copper wire, is deformed to have a rectangular cross-section, the portion formed with a rectangular cross-section being the portion corresponding to a lead wire 22a at the start of the winding and a multi-layered portion. A recessed groove 261 formed in the inner wall of a first flange portion 16b is formed with a rectangular cross-section approximately matching the outer shape of the rectangular cross-section of the lead wire 22a, and the lead wire 22a is housed therein.

In Embodiment 4, the starting portion of this field winding 22 which has a circular cross-section is wound around an anchor portion 16c on a bobbin 16, then the lead wire 22a which has a rectangular cross-section is inserted into the recessed groove 261 which also has a rectangular cross-section. Next, the field winding 22 is drawn from the inner circumferential end of the recessed groove 261 along the inner wall of a first flange portion 16b onto the cylindrical portion 16a. At this point, side tape 17b is pasted onto the inner wall of the first flange portion 16b so as to cover the lead wire 22a which is housed in the recessed groove 261. Then, the field winding 22 which has a rectangular cross-section drawn out onto the cylindrical portion 16a is lined up in rows in the axial direction as it is wound onto the cylindrical portion 16a from the first flange portion 16b to a second flange portion 16b. At this time, the field winding 22 is wound onto the cylindrical portion 16a such that the pair of broad flat surfaces face the inner circumferential side and the outer circumferential side, respectively, relative to the radial direction of the cylindrical portion 16a. Then, when a first layer of winding is finished, a second layer is lined up in rows in the axial direction as it is wound on top of the first layer of winding from the second flange portion 16b back to the first flange portion 16b. In this way, the field winding 22 is wound up layer by layer in order from the bottom of the cylindrical portion 16a, and when a predetermined number of layers have been wound, the outer circumferential tape 17c is wound onto the outermost circumferential portion. In addition, the multi-layered portion of the field winding 22 is saturated with varnish.

Consequently, in Embodiment 4, the winding constituting the lead wire 22a and the multi-layered portion is formed with a rectangular cross-section, achieving the addition of the effects of Embodiment 3 to the effects of Embodiment 1.
Embodiment 5

Figure 5:
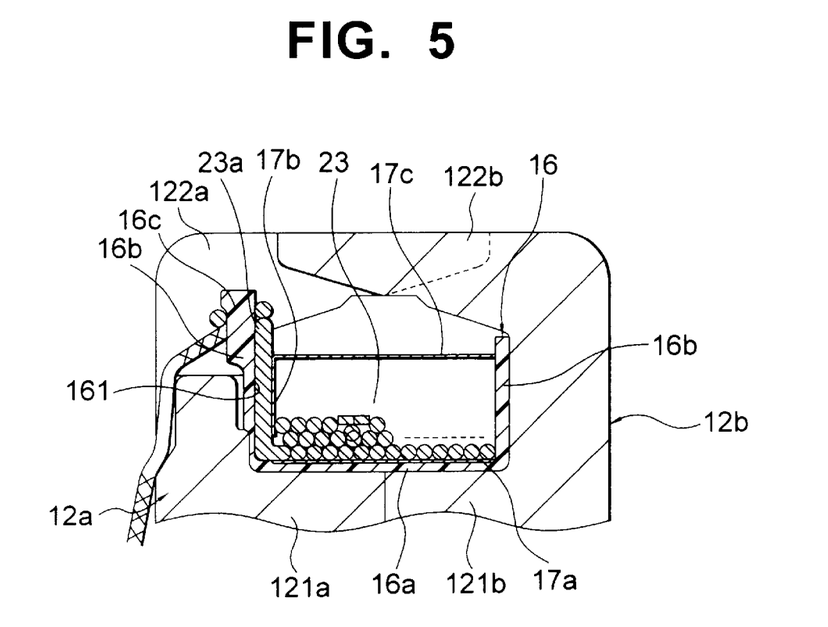
FIG. 5 is a partial cross-section of a rotor for an automotive alternator according to Embodiment 5 of the present invention.

FIG. 5 is a partial cross-section of a rotor for an automotive alternator according to Embodiment 5 of the present invention.

In the figure, a portion of a field winding 23, which is made of a circular copper wire, is deformed to have a rectangular cross-section, the portion of the winding formed with a rectangular cross-section corresponding to the position above a portion of the winding riding on an adjacent portion when the center of the wire, which has a circular cross-section, wound in the multi-layered portion is displaced by more than one radius or less than one radius in the axial direction.

Moreover, the rest of the construction is the same as for the conventional rotor shown in FIGS. 6 to 8.

In Embodiment 5, the starting portion of this field winding 23 which has a circular cross-section is wound around an anchor portion 16c on a bobbin 16, then the lead wire 23a which has a circular cross-section is inserted into a recessed groove 161 which has a U-shaped cross-section. Next, the field winding 23 which has a circular cross-section is drawn from the inner circumferential end of the recessed groove 161 along the inner wall of a first flange portion 16b onto a cylindrical portion 16a. At this point, side tape 17b is pasted onto the inner wall of the first flange portion 16b so as to cover the lead wire 23a which is housed in the recessed groove 161. Then, the field winding 23 which has a circular cross-section drawn out onto the cylindrical portion 16a is lined up in rows in the axial direction as it is wound onto the cylindrical portion 16a from the first flange portion 16b to a second flange portion 16b. Then, when a first layer of winding is finished, a second layer is lined up in rows in the axial direction as it is wound on top of the first layer of winding from the second flange portion 16b back to the first flange portion 16b. In this way, the field winding 23 is wound up layer by layer in order from the bottom of the cylindrical portion 16a, and when a predetermined number of layers have been wound, the outer circumferential tape 17c is wound onto the outermost circumferential portion. In addition, the multi-layered portion of the field winding 23 is saturated with varnish.

Now, the winding of the field winding 23 onto the cylindrical portion 16a is monitored by a sensor, etc., for riding of portions of the winding. Then, if riding of a portion of the winding is detected, the portions of the winding wound in the next layer above the riding portion are formed with a rectangular cross-section and winding is continued.

In Embodiment 5, portions of the winding wound above a riding portion are formed with a rectangular cross-section, and therefore irregularities arising due to riding of that portion of the winding are absorbed by the portions of the winding thereabove having rectangular cross-sections, the outer circumferential surface thereof being adjusted to have substantially the same radial height.

Thus, even if riding of portions of the winding occurs when a wire having a circular cross-section is wound in multiple layers onto the cylindrical portion 16c, irregularities resulting from that riding of portions of the winding can be absorbed in the process of winding the layer above, facilitating the alignment of the winding in the outer circumference as well as suppressing eccentricities in the multi-layered portion.

In this way, by Embodiment 5, it is possible to provide a multi-layered portion without eccentricities even if the multi-layered portion is composed of wire having a circular cross-section, and therefore even when the centrifugal force acts during high-speed rotation, disarray does not occur, vibrations in the multi-layered portion are suppressed, and bending of the rotating shaft 11 and disconnection of the winding connections are prevented.

Furthermore, forming the field winding with a rectangular cross-section is only partial, enabling the winding operation to be improved.

Moreover, in Embodiment 5, the lead wire 23a has a circular cross-section, but the lead wire 23a may be formed with a rectangular cross-section, and a bobbin 16 formed with a recessed groove having a rectangular cross-section may be used.

The present invention is constructed in the above manner and exhibits the effects described below.

According to one aspect of the present invention, there is provided a rotor for an automotive alternator comprising a pair of field cores each having a cylindrical base portion and a plurality of claw-shaped magnetic poles projecting from the outer circumferential edges of the base portions, the field cores being secured to a rotating shaft facing each other such that the end surfaces of the base portions are in close contact with each other and the claw-shaped magnetic poles intermesh with each other; a cylindrical bobbin fitted over the base portions of the pair of field cores, the bobbin having a cylindrical portion, a pair of first and second annular flange portions projecting perpendicularly from both ends of the cylindrical portion, a recessed groove disposed at an angle to the radial direction in the inner wall of the first flange portion, and an anchor portion disposed on an outer circumferential portion of the first flange portion in close proximity to the outer circumferential end of the recessed groove; and a field winding having a circular cross-section, the starting portion of which is wound around the anchor portion and housed in the recessed groove, then drawn from the inner circumferential end of the recessed groove onto the outer circumferential surface of the cylindrical portion of the bobbin, and additionally wound a predetermined number of turns into multiple layers on the cylindrical portion of the bobbin, wherein at least one portion of the field winding excluding the prewind portion and the postwind portion is formed with a rectangular cross-section, Thus, it is possible to provide a rotor for an automobile alternator capable of facilitating connection of the prewind portion and postwind portion of the field winding to connection terminals and improving resistance to centrifugal force.

The portions of the field winding constituting the multi-layered portion formed by winding multiple layers onto the cylindrical portion of a bobbin are formed with a rectangular cross-section. Thus, adjacent portions of the field winding constituting the multi-layered portion are wound with flat surfaces in contact in both the axial and radial directions, enabling the multi-layered portion to be formed with a sturdily aligned construction without eccentricities and increasing strength with respect to high-speed rotation, and the edges of the portions of the field winding previously wound can serve as guides for further winding, facilitating alignment and improving the winding operation.

The width of the rectangular cross-section of the field winding is a simple fraction of the distance between the pair of flange portions, enabling the field winding to be wound between the pair of flange portions without gaps, and therefore each layer of the multi-layered portion can be wound reliably in rows without displacement in the axial direction, preventing disarray of the winding as well as reducing deformation of the bobbin.

The portions positioned directly above riding portions which occur in the field winding constituting the multi-layered portion formed by winding multiple layers onto the cylindrical portion of a bobbin are formed with a rectangular cross-section, and therefore eccentricities in the multi-layered portion due to riding portions are suppressed, enabling disarray in the winding caused by the centrifugal force acting during high-speed rotation to be prevented and vibrations in the multi-layered portion to be suppressed, and in addition, formation of the field winding with a rectangular cross-section is only partial, enabling the winding operation to be improved.

The portion of the field winding housed in the recessed groove is formed with a rectangular cross-section, and the recessed groove is formed with a rectangular internal shape approximately matching the outside shape of the portion of the field winding housed therein, ensuring that the portion around the outside of the recessed groove is strong without enlarging the axial dimension of the bobbin, thereby preventing damage to the bobbin caused by the centrifugal force acting during high-speed rotation.

What is claimed is:

1. A rotor for an automotive alternator, comprising:
    a pair of field cores each having a cylindrical base portion and a plurality of claw-shaped magnetic poles projecting from outer circumferential edges of said base portions, said field cores being secured to a rotating shaft facing each other such that end surfaces of said base portions are in close contact with each other and said claw-shaped magnetic poles intermesh with each other;
    a cylindrical bobbin fitted over said base portions of said pair of field cores, said bobbin having a cylindrical portion, a pair of first and second annular flange portions projecting perpendicularly from both ends of said cylindrical portion, a recessed groove disposed at an angle to a radial direction in an inner wall of said first flange portion, and an anchor portion disposed on an outer circumferential portion of said first flange portion, in close proximity to an outer circumferential end of said recessed groove; and
    a field winding having a circular cross-section, a starting portion which is wound around said anchor portion and housed in said recessed groove, then drawn from an inner circumferential end of said recessed groove onto an outer circumferential surface of said cylindrical portion of said bobbin, and additionally wound a predetermined number of turns into multiple layers on said cylindrical portion of the bobbin,
    wherein at least one portion of said field winding excluding a prewind portion and a postwind portion is formed with a rectangular cross-section; and
    wherein the portion of said field winding housed in said recessed groove is formed with a rectangular cross-section, and said recessed groove is formed with a rectangular internal cross-section approximately matching an external shape of said portion of said field winding housed therein.

2. The rotor for an automotive alternator according to claim 1, wherein the portions of said field winding constituting a multi-layered portion formed by winding multiple layers onto said cylindrical portion of said bobbin are formed with a rectangular cross-section.

3. The rotor for an automotive alternator according to claim 2, wherein a width of said field winding formed with said rectangular cross-section is a simple fraction of a distance between said pair of flange portions.

4. A rotor for an automotive alternator, comprising:
    a pair of field cores each having a cylindrical base portion and a plurality of claw-shaped magnetic poles projecting from outer circumferential edges of said base portions, said field cores being secured to a rotating shaft facing each other such that end surfaces of said base portions are in close contact with each other and said claw-shaped magnetic poles intermesh with each other;
    a cylindrical bobbin fitted over said base portions of said pair of field cores, said bobbin having a cylindrical portion, a pair of first and second annular flange portions projecting perpendicularly from both ends of said cylindrical portion, a recessed groove disposed at an angle to a radial direction in an inner wall of said first flange portion, and an anchor portion disposed on an outer circumferential portion of said first flange portion, in close proximity to an outer circumferential end of said recessed groove; and
    a field winding having a circular cross-section, a starting portion which is wound around said anchor portion and housed in said recessed groove, then drawn from an inner circumferential end of said recessed groove onto an outer circumferential surface of said cylindrical portion of said bobbin, and additionally wound a predetermined number of turns into multiple layers on said cylindrical portion of the bobbin,
    wherein at least one portion of said field winding excluding a prewind portion and a postwind portion is formed with a rectangular cross-section; and
    wherein portions positioned directly above riding portions which occur in said field winding constituting a multi-layered portion formed by winding multiple layers onto said cylindrical portion of said bobbin are formed with a rectangular cross-section.

5. The rotor for an automotive alternator according to claim 4, wherein the portion of said field winding housed in said recessed groove is formed with a rectangular cross-section, and said recessed groove is formed with a rectangular internal cross-section approximately matching an external shape of said portion of said field winding housed therein.

6. A rotor for an automotive alternator, comprising:
    a pair of field cores each having a cylindrical base portion and a plurality of claw-shaped magnetic poles projecting from outer circumferential edges of said base portions, said field cores being secured to a rotating shaft facing each other such that end surfaces of said base portions are in close contact with each other and said claw-shaped magnetic poles intermesh with each other;

a cylindrical bobbin fitted over said base portions of said pair of field cores, said bobbin having a cylindrical portion, a pair of first and second annular flange portions projecting perpendicularly from both ends of said cylindrical portion, a recessed groove disposed at an angle to a radial direction in an inner wall of said first flange portion, and an anchor portion disposed on an outer circumferential portion of said first flange portion in close proximity to an outer circumferential end of said recessed groove; and a field winding having a circular cross-section, a starting portion which is wound around said anchor portion and housed in said recessed groove, then drawn from an inner circumferential end of said recessed groove onto an outer circumferential surface of said cylindrical portion of said bobbin, and additionally wound a predetermined number of turns into multiple layers on said cylindrical portion of the bobbin, wherein the portion of said field winding housed in said recessed groove is formed with a rectangular cross-section, and said recessed groove is formed with a rectangular internal cross-section approximately matching an external shape of said portion of said field winding housed therein.

* * * * *